（12）United States Patent
Giancola

(10) Patent No.: US 8,600,433 B2
(45) Date of Patent: Dec. 3, 2013

(54) RECEIVER COMPRISING SELECTABLE SIGNAL PROCESSING SUB-SYSTEMS

(75) Inventor: Diego Giancola, Cambridge (GB)

(73) Assignee: Cambridge Silicon Radio Ltd., Cambridge (GB)

( * ) Notice: Subject to any disclaimer, the term of this patent is extended or adjusted under 35 U.S.C. 154(b) by 1181 days.

(21) Appl. No.: 12/165,954

(22) Filed: Jul. 1, 2008

(65) Prior Publication Data

US 2010/0002814 A1    Jan. 7, 2010

(51) Int. Cl.
*H04B 1/10* (2006.01)
*H04L 27/06* (2006.01)

(52) U.S. Cl.
USPC ............ 455/552.1; 455/188.1; 375/340; 375/349

(58) Field of Classification Search
USPC .......... 455/552.1, 132, 133, 134, 135, 136, 455/140, 67.13, 168.1, 188.1, 550.1, 553.1, 455/574; 375/340, 349
See application file for complete search history.

(56) References Cited

U.S. PATENT DOCUMENTS

| | | | |
|---|---|---|---|
| 7,082,305 B2* | 7/2006 | Willars et al. | 455/441 |
| 7,088,955 B2* | 8/2006 | Challa et al. | 455/63.3 |
| 7,302,229 B2* | 11/2007 | Riddles | 455/41.2 |
| 7,496,376 B2* | 2/2009 | Campo Camacho et al. | 455/522 |
| 7,539,175 B2* | 5/2009 | White et al. | 370/350 |
| 7,702,298 B2* | 4/2010 | Barratt et al. | 455/101 |
| 7,711,341 B2* | 5/2010 | Haub | 455/296 |
| 8,107,457 B2* | 1/2012 | White et al. | 370/350 |
| 8,244,298 B2* | 8/2012 | Luschi et al. | 455/553.1 |
| 2004/0018853 A1* | 1/2004 | Lewis | 455/552.1 |
| 2004/0075606 A1* | 4/2004 | Laiho et al. | 342/357.1 |
| 2009/0082017 A1* | 3/2009 | Chang et al. | 455/435.2 |

* cited by examiner

*Primary Examiner* — Blane J Jackson
(74) *Attorney, Agent, or Firm* — RatnerPrestia

(57) ABSTRACT

A receiver for a telecommunications system, wherein the receiver is capable of using a plurality of available alternative receiver sub-systems and the receiver comprises selection means for selecting one of the plurality of receiver sub-systems for use in processing a received signal according to conditions of the propagation channel through which the received signal was received.

11 Claims, 1 Drawing Sheet

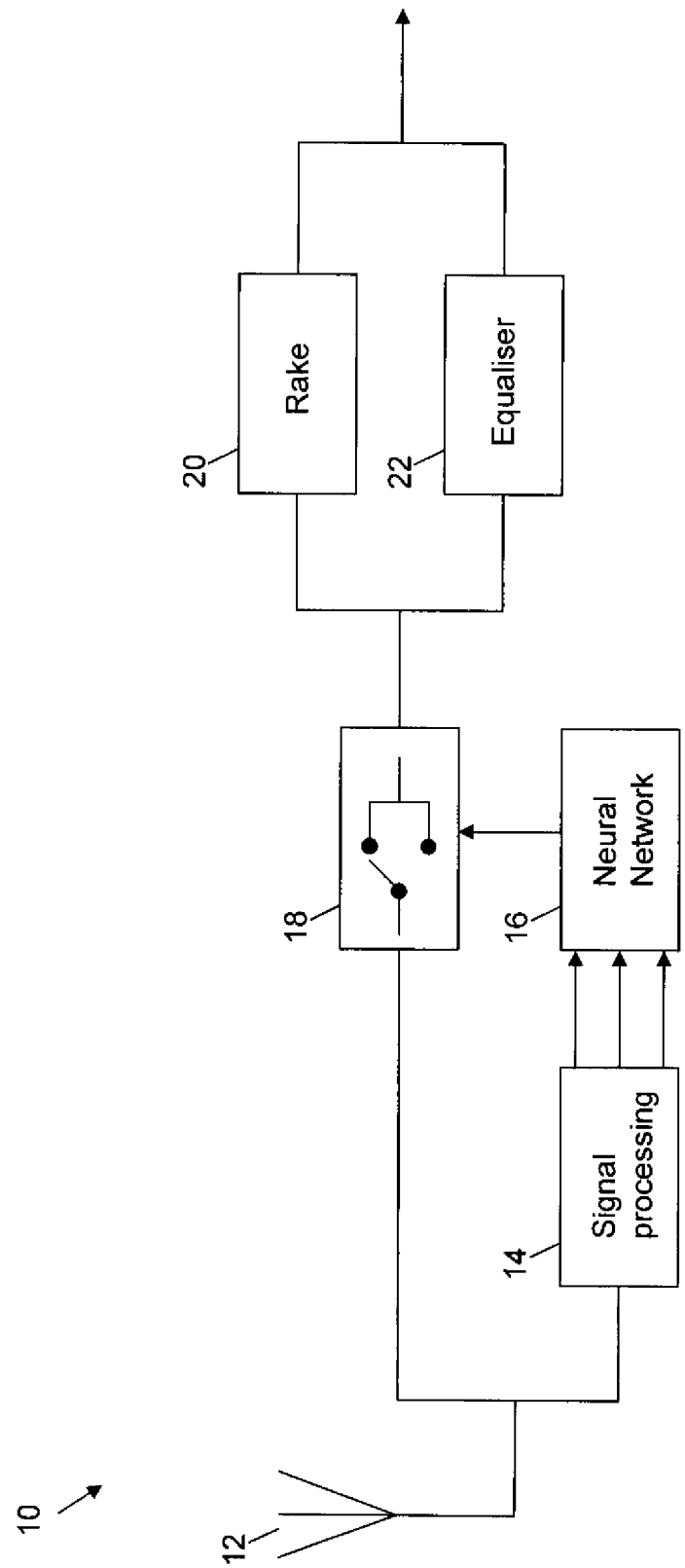

RECEIVER COMPRISING SELECTABLE SIGNAL PROCESSING SUB-SYSTEMS

FIELD OF THE INVENTION

The present invention relates to receiver for a telecommunications system, and to a method of processing a signal.

BACKGROUND OF THE INVENTION

In communications systems such as Wideband CDMA (WCDMA), the propagation channel through which a signal is transmitted affects the quality of the signal received by a receiver such as a mobile telephone or similar mobile communications device. Various different receiver architectures, such as rake receivers and equalisers, are known and are used to negate the detrimental effects of the propagation channel on signals. The different receiver architectures each have their own strengths and weaknesses. For example, a rake-based receiver typically provides higher quality signal reception than an equaliser-based receiver when there is an almost perfect (line of sight) propagation channel, whilst in a propagation channel which gives rise to several multipath components, an equaliser-based receiver typically provides higher quality signal reception than a rake-based receiver.

Typically a receiver used in a mobile communications device such as a mobile telephone is based on a single receiver architecture, and thus the device suffers from the weaknesses of the receiver architecture on which it is based, in that it is most effective in certain propagation channel conditions, and becomes less effective in channel conditions which differ from these conditions. As users of such devices tend not to remain stationary, the conditions of the propagation channel through which signals are received by the receiver tend to change, sometimes rapidly, and this can lead to a marked decrease in the quality of the received signal, which is manifested as a degradation in the performance of the device, for example in reduced speech quality.

SUMMARY OF THE INVENTION

According to a first aspect of the invention, there is provided a receiver for a telecommunications system, wherein the receiver is capable of using a plurality of available alternative receiver sub-systems and the receiver comprises a selector for selecting one of the plurality of receiver sub-systems for use in processing a received signal according to conditions of the propagation channel through which the received signal was received.

In a receiver according to the first aspect of the invention, a receiver sub-system that is expected to have the best performance in the prevailing propagation channel conditions can be selected, thus improving the likelihood of high quality signal reception, which in turn leads to an improved user experience, as there is less likelihood of degradation in receiver performance as the user moves around, or as the propagation channel conditions change.

The plurality of receiver sub-systems may comprise a rake receiver sub-system and an equaliser sub-system.

The selector may comprise an artificial neural network.

An input of the artificial neural network may comprise an indication of the signal to interference ratio of the received signal.

An input of the artificial neural network may comprise a measure indicative of the speed of the receiver.

An input of the artificial neural network may comprise a channel function which provides information on the performance of each of the plurality of receiver sub-systems in different propagation channel conditions.

The measure indicative of the speed of the receiver may be derived from a Doppler measurement.

According to a second aspect of the invention, there is provided a mobile communications device comprising a receiver according to the first aspect of the invention.

According to a third aspect of the invention, there is provided a method of processing a signal received through a propagation channel by a receiver capable of using a plurality of available alternative receiver sub-systems, the method comprising selecting one of the plurality of receiver sub-systems according to conditions of the propagation channel and processing the signal using the selected sub-system.

The plurality of receiver subsystems may comprise a rake receiver sub-system and an equaliser sub-system.

Selecting one of the plurality of receiver sub-systems may be performed by reference to an output of an artificial neural network.

An input of the artificial neural network may comprise an indication of the signal to interference ratio of the received signal.

An input of the artificial neural network may comprise a measure indicative of the speed of the receiver.

An input of the artificial neural network may comprise a channel function which provides information on the performance of each of the plurality of receiver sub-systems in different propagation channel conditions.

The measure indicative of the speed of the receiver may be derived from a Doppler measurement.

BRIEF DESCRIPTION OF THE DRAWING

Embodiments of the invention will now be described, strictly by way of example only, with reference to the accompanying drawing, FIG. 1, which is a schematic representation of a receiver according to the invention.

DETAILED DESCRIPTION OF THE PREFERRED EMBODIMENT

Referring to FIG. 1, a receiver, which may form part of a mobile communications device such as a mobile telephone, is shown generally at 10. It is to be understood that the functional blocks shown in FIG. 1 represent processing operations performed on a received signal, but do not necessarily correspond directly to physical units that may appear within a practical implementation of a receiver.

The receiver 10 includes an antenna 12 through which signals transmitted through a propagation channel are received. Information about the conditions prevailing in the propagation channel is derived from the signal received at the antenna 12 by a signal processing element 14, which may be, for example, a suitably-configured digital signal processor (DSP). Outputs of the signal processing element 14 representative of the information derived from the signal are used as inputs to an artificial neural network (ANN) 16, which produces, at an output, a decision which is used as an input for a selector 18. The selector 18 selects one of a rake receiver 20 or an equaliser 22 for processing the received signal, depending upon the input signal received by the selector 18 from the output of the ANN 16.

In this embodiment, the signal processing element 14 produces three variables as outputs, which are used as inputs to the ANN 16. The three variables are a measure or metric indicative of the speed of the receiver 10, an indication of the signal to interference ratio (SIR) of the received signal, and a "channel function", which is a function based on theory or observations that a particular receiver architecture performs best in particular propagation channel conditions. The three variables each affect the choice of the receiver architecture to be used in processing the received signal, as will now be explained.

The speed of the receiver 10 is important, as a particular receiver architecture may perform better than others in conditions where the receiver is moving at speed, for example if one receiver architecture is able to reconfigure itself more quickly than others. The measure or metric indicative of the speed of the receiver 10 in this example is derived from a Doppler measurement, as will be familiar to those skilled in the relevant art. However, it will be understood that other methods are equally applicable for determining the measure or metric.

Similarly, the SIR of the received signal affects the choice of which receiver architecture to use to process the received signal, as different receiver architectures may perform differently depending on the SIR of the received signal.

The channel function may, for example, comprise a ratio of the energy contained in the first received signal path to the energy contained in subsequent received signal paths within the current multipath profile. Where several multipath components are received, the energy of the first signal received and subsequent signals received via different propagation paths may be similar, and the ratio of the energy of the first received signal to the energy of the subsequent received signals may be small, suggesting that an equaliser-based receiver architecture is most suited to the prevailing propagation channel conditions. On the other hand, if almost line of sight propagation channel conditions prevail, the first received signal may have considerably more energy than subsequently received signals, and the ratio may therefore be very large, suggesting that a rake-based receiver architecture is most suited to the prevailing propagation channel conditions.

The three variables derived by the signal processing element 14 from the received signal are used as inputs to the ANN 16, which produces as its output a decision, based on the input variables and rules that have been learned by the ANN 16, as to which of the receiver architectures 20, 22 is to be used for processing the received signal. This decision is used as an input to the selector 18, which directs the received signal towards either the rake receiver architecture 20 or the equaliser architecture 22, in accordance with the decision of the ANN 16. Although in this embodiment all three of the inputs are used by the ANN 16 to arrive at the output decision, in certain circumstances it may be appropriate to use only one or two of the input variables to arrive at the output decision.

As the receiver 10 may have difficulty in adapting to fast-changing propagation channel conditions, the selection of which of the receiver architectures 20, 22 is to be used for processing the received signal should be made prior to setting up a data channel for data transfer, to prevent the receiver from oscillating between architectures during data transfer.

In order to achieve satisfactory results, the ANN 16 must be trained, and this is done in a generally conventional manner by presenting known training data as the input variables and tailoring weights of the ANN 16 so as to produce a desired output for the known training data. Preferably training of the ANN 16 occurs prior to production of the receiver 10, so that a user of the receiver 10 is not obliged to re-train the ANN 16, although updates may be made available to users for retraining the ANN 16.

The invention claimed is:

1. A receiver for a telecommunications system, the receiver comprising a plurality of alternative receiver sub-systems comprising a rake receiver sub-system and an equaliser sub-system, each of the plurality of alternative receiver sub-systems being configured to compensate for effects of a propagation channel on a signal received by the receiver, and a selector, wherein the selector comprises an artificial neural network that is configured to select one of the plurality of alternative receiver sub-systems to process the received signal according to conditions of the propagation channel through which the received signal was received.

2. A receiver according to claim 1 wherein an input of the artificial neural network comprises an indication of the signal to interference ratio of the received signal.

3. A receiver according to claim 1 wherein an input of the artificial neural network comprises a measure indicative of the speed of the receiver.

4. A receiver according to claim 1 wherein an input of the artificial neural network comprises a channel function which provides information on the performance of each of the plurality of receiver sub-systems in different propagation channel conditions.

5. A receiver according to claim 3 wherein the measure indicative of the speed of the receiver is derived from a Doppler measurement.

6. A mobile communications device comprising a receiver according to claim 1.

7. A method of processing a signal received through a propagation channel by a receiver comprising a plurality of alternative receiver sub-systems comprising a rake receiver sub-system and an equaliser sub-system, each of the plurality of alternative receiver sub-systems being configured to compensate for effects of a propagation channel on a signal received by the receiver, the method comprising selecting, by reference to an output of an artificial neural network, one of the plurality of alternative receiver sub-systems according to conditions of the propagation channel and processing the signal using the selected sub-system.

8. A method according to claim 7 wherein an input of the artificial neural network comprises an indication of the signal to interference ratio of the received signal.

9. A method according to claim 7 wherein an input of the artificial neural network comprises a measure indicative of the speed of the receiver.

10. A method according to claim 7 wherein an input of the artificial neural network comprises a channel function which provides information on the performance of each of the plurality of receiver sub-systems in different propagation channel conditions.

11. A method according to claim 9 wherein the measure indicative of the speed of the receiver is derived from a Doppler measurement.

* * * * *